C. HOWELL.
Revolving Harrow.
No. 22,502. Patented Jan. 4, 1859.
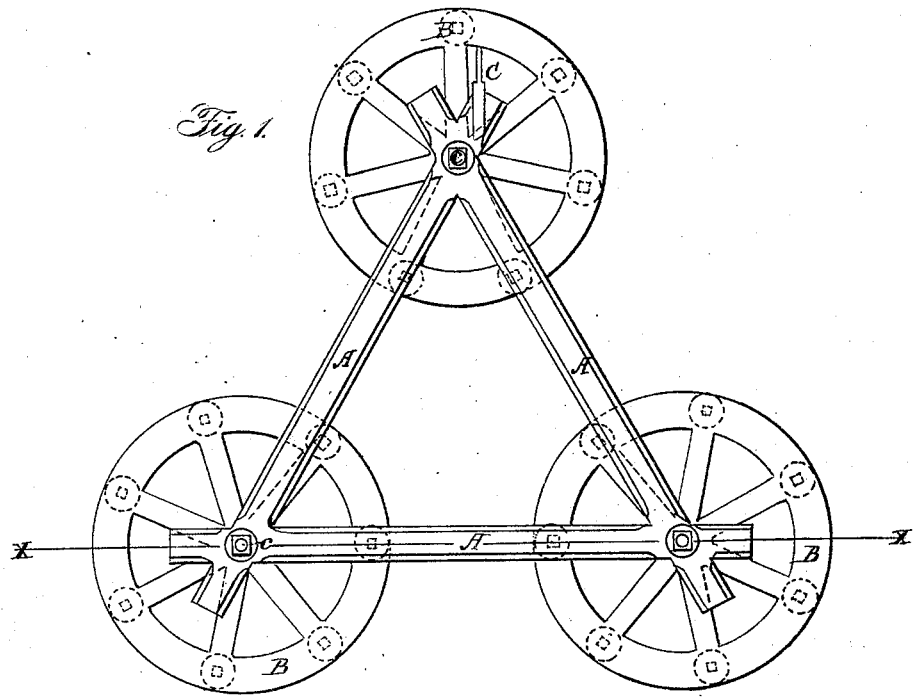
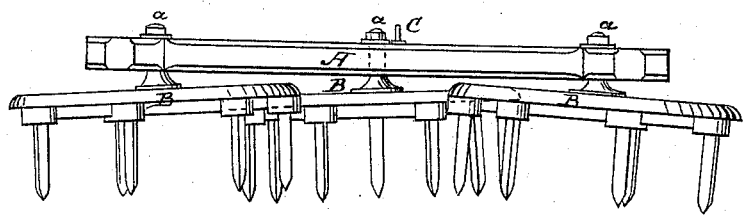
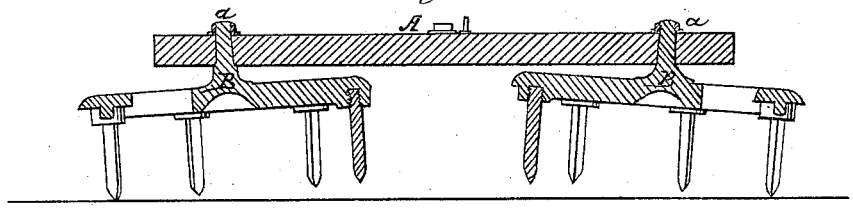
Witnesses:
A. G. Seals
Hny F. Fargo
Inventor:
Charles Howell.

UNITED STATES PATENT OFFICE.

CHARLES HOWELL, OF CLEVELAND, OHIO.

IMPROVEMENT IN ROTARY HARROWS.

Specification forming part of Letters Patent No. 22,502, dated January 4, 1859.

*To all whom it may concern:*

Be it known that I, CHARLES HOWELL, of Cleveland, in the county of Cuyahoga and State of Ohio, have invented a certain new and useful Improvement in Rotating Harrows, of which the following is a full, clear, and exact description, reference being had to the accompanying drawings of the same, making part of this specification, in which—

Figure 1 represents a plan of a harrow embracing my improvement, and Fig. 2 a rear end view of the same, showing the whole set at an angle for the purpose of effecting a compulsory rotary motion; and Fig. 3, a vertical transverse section of the same, taken through the line $x\ x$ of Fig. 1.

My invention relates to that class of rotary harrows in which the various harrows are adjusted so as to set them at an angle to the ground for the purpose of effecting a compulsory rotary motion. These as heretofore constructed are defective, first, in those in which two are used and connected together, because that the moment power is applied to drag the harrow the forward end of the frame is raised, thereby depressing the rear ends of the harrows, causing the tines in the rear to enter the ground deeper than those on the sides or in front, thus preventing the rotation of the harrows—the great desideratum required; and, secondly, in those having three, because that they are so constructed as to require the use of separate devices to adjust each of the harrows to an angle—such as friction-rolls mounted on adjustable screws screwed to the main frame to which the harrows are attached—which devices not only serve to complicate and increase the cost and expense of the machine, but are constantly becoming inoperative by getting out of order, to obviate all of which is the object of my invention; and it consists, first, in combining three rotary harrows in one machine, the axis of each of which and on which they rotate is set at an angle to the plane of the machine, by means of which, on the advance of the machine a compulsory rotary motion is communicated to the whole and the raising of the front part of the harrow prevented.

Secondly. It consists in so arranging the drag-hook in relation to the angle of the front harrow as that the position of the one will counterbalance and neutralize the drag of the other, whereby the drag of the machine is equalized and rendered uniform when the inclination of the two rear harrows is so arranged as that the drag of the one will neutralize that of the other.

To enable others skilled in the art to construct and use my invention, I will now proceed to describe its parts in detail.

In the accompanying drawings the frame A of the harrow is represented as being of triangular form, through the angles of which oblique mortises are formed, through which the axes $a$ of the harrow B pass, the two rear ones in opposite directions, as shown in Fig. 3, thus throwing their respective harrows in an opposite inclined position, as shown at Fig. 2, thereby neutralizing each other's drag. The axis of the front harrow is also inclined, as seen at Fig. 2; but as the inclination of the latter would necessarily increase the drag on that side in which the teeth of the harrow is most depressed, the drag is neutralized by arranging the drag-hook $c$ of the harrow on the other side of its axis, thus rendering the resistance and drag of the whole uniform.

Having thus described my improvement, what I claim as new, and desire to secure by Letters Patent, is—

1. The arrangement and combination of three rotary harrows, when the axis of each is inclined in the manner and for the purposes substantially as described.

2. The arrangement of the hook $c$ in relation to the front harrow, when combined with two harrows in the rear, arranged to operate in the manner set forth.

In testimony whereof I hereunto set my hand to this specification.

CHAS. HOWELL.

Witnesses:
J. C. VAIL,
R. E. ADAMS.